March 6, 1956 H. G. HEINRICH 2,737,358
LOW OPENING SHOCK STABILIZED PARACHUTE
Filed Dec. 30, 1953 2 Sheets-Sheet 1
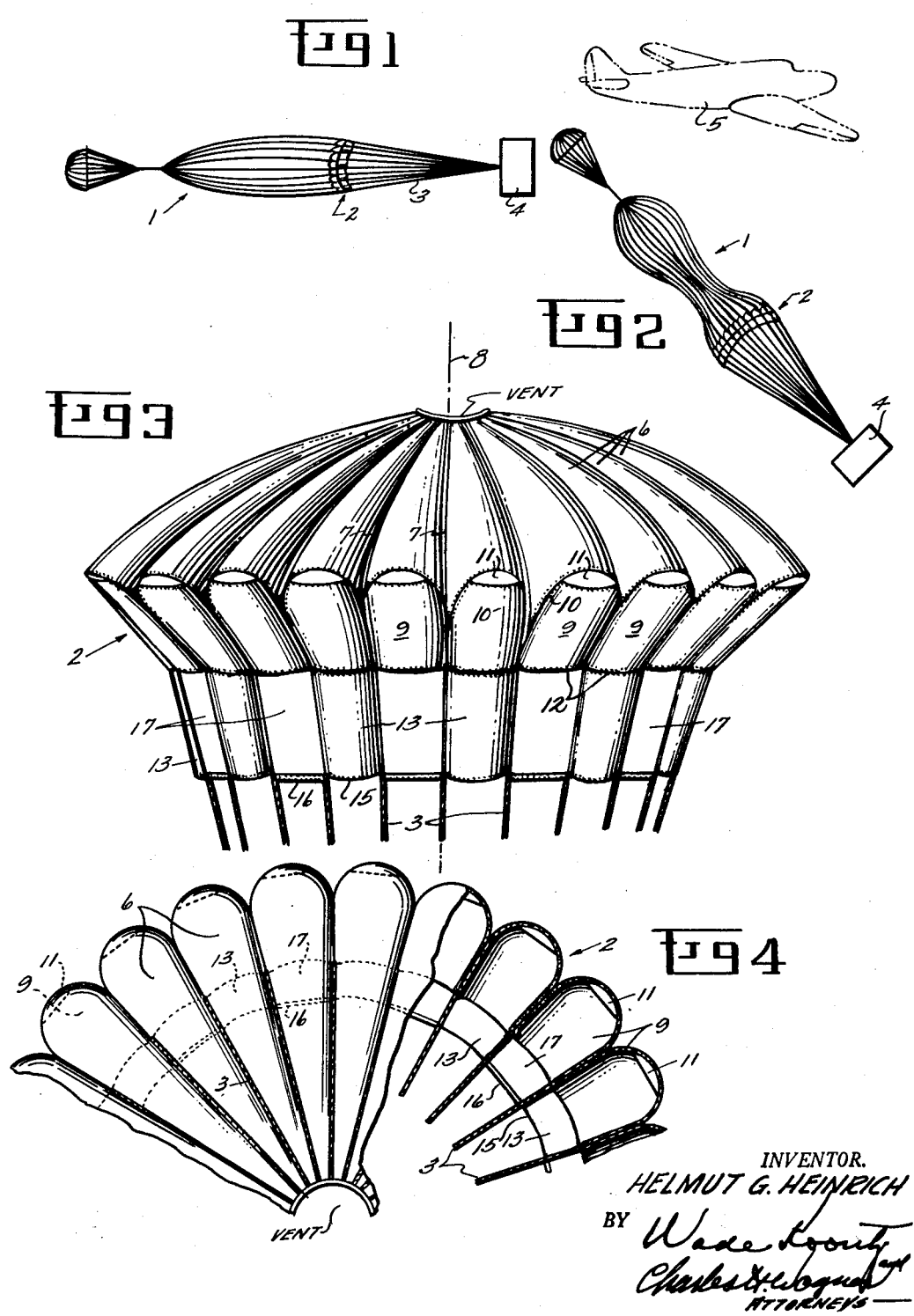
INVENTOR.
HELMUT G. HEINRICH
BY
ATTORNEYS March 6, 1956 H. G. HEINRICH 2,737,358
LOW OPENING SHOCK STABILIZED PARACHUTE
Filed Dec. 30, 1953 2 Sheets-Sheet 2

INVENTOR.
HELMUT G. HEINRICH
BY
ATTORNEYS

United States Patent Office 2,737,358
Patented Mar. 6, 1956

2,737,358

LOW OPENING SHOCK STABILIZED PARACHUTE

Helmut G. Heinrich, Dayton, Ohio, assignor to Pioneer Parachute Company, Inc., Manchester, Conn., a corporation of Connecticut Application December 30, 1953, Serial No. 401,440

17 Claims. (Cl. 244—145)

(Granted under Title 35, U. S. Code (1952), sec. 266)

The invention described herein may be manufactured and used by or for the Government for governmental purposes without payment to me of any royalty thereon.

This invention relates to improvements in parachutes and is directed particularly to constructions capable of use at high speeds and yet characterized by its remarkably low opening shock and improved stability.

Conventional parachutes heretofore constructed have not generally been capable of use at high speeds, that is at speeds much over 200 miles per hour, because of the terrific strains imposed upon the fabric and suspension lines of the parachute and upon the wearer or load supported thereby. In addition conventional parachutes with moderate porosity at such high speeds are difficult to inflate because the velocity of the air stream flowing parallel to the extended but unopened canopy is so great as to oppose the radial movement of the fabric which is necessary to expand the skirt and permit proper opening of the canopy. The parachute instead tends to assume a chimney effect in which the limited amount of air entering the skirt flows out through the peak of the canopy or through the pores of the fabric. The canopy then has a squidding effect or "streams" instead of opening properly and may even fail to open at all.

A reduction in the porosity of the fabric will serve to reduce squidding and increase the strength of the fabric but the tendency of less porous parachutes to oscillate or vibrate at high speeds is then increased and the stability of the parachute is markedly reduced whereas shock loading may be even further increased.

If the parachute does not squid or stream the air rushing into the canopy at high speed causes it to open suddenly with the result that the shock loading becomes so great that the fabric may rupture, or the shock upon the wearer may cause serious injury, or the lines supporting the load may snap. Furthermore high frequency oscillations develop at high speeds and these cannot be damped out even by the addition of guide vanes alone.

Parachutes constructed in accordance with my copending application Serial No. 194,546, filed November 7, 1950, now issued as Patent No. 2,683,575, serve to overcome or diminish certain of these disadvantages in that they are provided with spaced extensions or spoiler flaps extending downward about the skirt of the canopy in a manner to retard outward movement of the skirt as it expands during opening of the canopy. In this way the inflation period of the canopy is prolonged and the shock loading is materially reduced. Moreover the increased turbulence of the air flowing upward about the skirt and between the spoiler flaps serves to increase the effective drag of the parachute. However, the angular inclination and guide vane effect of the spaced flaps or skirt extensions is limited and is frequently insufficient to prevent undesired oscillation of the canopy under very high speed conditions of use and in those applications wherein the maximum stability is required or desirable.

In accordance with the present invention parachutes having spaced skirt extensions or spoiler flaps are provided with means which cooperate with the flaps in such a way as to materially increase the aerodynamic stability of the parachute. The spoiler flaps serve to damp the high speed oscillations which cannot be eliminated by the use of guide vanes alone and accordingly the parachute is much more stable than would be possible if either of the cooperating elements were omitted. The parachute can therefore be employed at much higher speeds than heretofore and approaching the supersonic range. At the same time the shock loading can be kept very low and in fact may not increase whatever even though the speed at which the parachute is released is increased to 300 or 400 miles per hour or more. The present invention further renders it possible to employ less porous fabrics than have heretofore been used whereby the strength of the fabric and the effective drag of the canopy will be increased.

These advantages are attained by providing the parachute with a canopy having spaced extensions or spoiler flaps inclined downwardly and inwardly below the skirt of the canopy and by providing the canopy with guide vane surfaces located adjacent and above the spoiler flaps and inclined upwardly and outwardly therefrom above the skirt of the canopy and in a manner to present a relatively sharp or abrupt boundary for the canopy which further serves to increase the turbulence of the air about the canopy and to afford greater stability and effective drag of the parachute.

One of the objects of the present invention is to provide a parachute which is safe and stable when used at high speeds.

Another object of the invention is to provide parachutes which are characterized by their relatively low shock opening and limited oscillation during descent.

A further object of the invention is to provide parachutes which have spaced spoiler flaps or extensions about the skirt with means for reducing the oscillation and increasing the effective drag thereof.

A specific object of the invention is to provide a parachute canopy with spaced inwardly and downwardly inclined spoiler flaps and adjacent upwardly and outwardly inclined guide vane surfaces cooperating to afford limited shock loading and increased stability of the parachute on release thereof at high speeds.

These and other objects and features of the present invention will appear from the following description thereof in which reference is made to the figures of the accompanying drawings.

*Drawings*

Fig. 1 is a side view of a parachute incorporating my invention, illustrating somewhat diagrammatically the parachute just after its release and beginning to open, the high speed aircraft which released the parachute being also shown diagrammatically in phantom.

Fig. 2 is a similar view of the parachute, schematically illustrating the same streaming and depicting the controlled inflating and "squidding" effect.

Fig. 3 is an enlarged side elevation of the fully inflated canopy shown in Figs. 1 and 2, parts of the shroud lines being broken away for convenience of the illustration.

Fig. 4 is a top, half plan, view of the parachute canopy illustrated in Fig. 3, part thereof being broken away to show the interior and illustrating the relative position of the spaced extensions or spoiler flaps as viewed from above.

Figure 5:
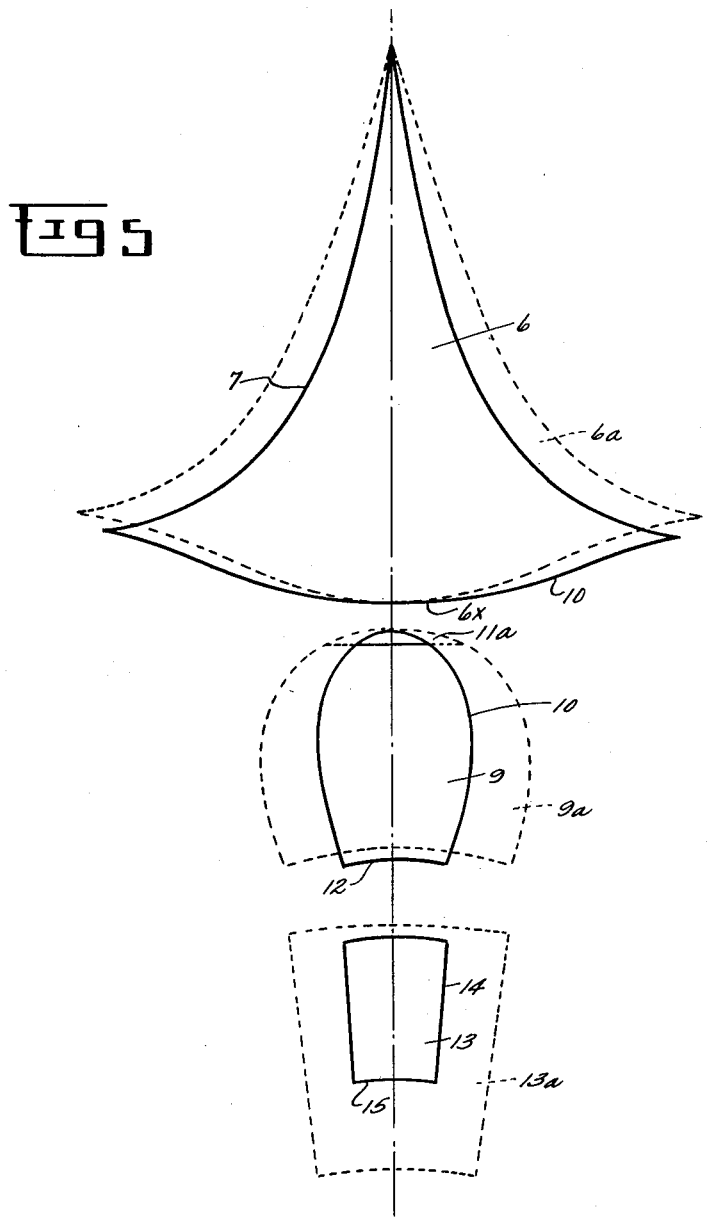
Fig. 5 is a plan view of the fabric elements employed in forming a gore and one end closure guide surface panel and spoiler flap in accordance with the present invention. The full lines indicate the general contour for a 24 gore chute and dotted lines for a 12 gore chute.

In the drawing the reference numeral 1 indicates the canopy generally, having a guide surface portion 2, shroud lines 3 connected to a supported load 4, the high speed aircraft from which the chute in Fig. 1 was released being somewhat diagrammatically shown at 5. The canopy comprises a top composed of a plurality of tapered radial gores or panels or segments 6 secured together along their adjacent longitudinal edges at 7. The gores or panels 6 are each transversely cambered, having low longitudinal camber, and a high transverse camber at their outer ends decreasing in height toward the center or vertical descent axis 8 of the canopy.

The shroud lines 3 are laid across the top of the canopy in the valleys formed between the crowned segments or gores 6 and secured thereto, particularly at the outer ends of the adjoining panels. The outer ends of the gores from the top centers of the transverse outer cambered portions are formed to incline downwardly and inwardly substantially in planes toward the descent axis at a material angle, approximately 45°, to the decent axis and at an angle greater than that assumed by the shroud lines 3. End closure or guide vane surface panels 9 are cut to fit the outer ends of the radial panels and are secured across the outer inclined ends. These end panels may be sewed together as at 10, and if desired air vents 11 may be provided somewhat as shown in Figs. 3 and 4. These guide vane surface panel members 9 are somewhat semi-elliptical in shape, presenting outwardly bowed or rounded surfaces having their lower edges 12 extending between the lower or outer ends of the panels. The shroud lines 3 incline straight downwardly and inwardly toward the descent axis with their lower ends adapted for connection to the load 4 to be suspended and lowered by the parachute. The spaced extensions or spoiler flaps are indicated at 13, extending downwardly and inwardly somewhat as shown, from the lower edges 12 of the predetermined end closure panels 9 and interposed between the shroud lines 3 which are secured to the longitudinally disposed edges 7 of the radial panels 6 to which the guide vane surface end closure panels 9 are connected, the opposite side edges 14 being secured, preferably throughout their length, to these shroud lines. Thus when the canopy is fully inflated the extensions or spoiler flaps 13 are substantially flat and extend generally parallel to the shroud lines 3 whereas the guide surface panels 9 are bowed outward circumferentially. The lower edges 15 of the flaps 13 are straight and parallel to the lower edges 12 of the guide vane surface panels 9. The lower edges are preferably reinforced against splitting and the ends of these lower edges may be connected together by some suitable flexible connections such as strong tapes 16. These connecting tapes 16 retain the lower ends of the flaps in a predetermined and proper relation to each other during packing release and opening and prevent outward displacement of the lower ends of the spoiler flaps by air pressure within the canopy during deceleration to the final maximum drag velocity.

As shown the spoiler flaps 13 are spaced around the base of the canopy below the guide vane surface portion 2 to leave an air vent or spillout opening 17 between each pair of adjacent flaps 13. This arrangement preferably requires an even number of radial panels 6 and adjoining inclined guide surface panels 9, with the spoiler flaps inclining downwardly at a lesser angle from spaced pairs of the said guide surface elements 9. Their side edges are, in this instance, connected or stretched across the pairs of the downwardly inclined shroud lines at the opposite sides of the flaps, the inclination of the flaps toward the descent axis being considerably less than the inclination of the guide surface elements 9. These flaps 13, as the chute is released at high speed, being held in place by the shroud lines and tapes 16, should the tapes be employed, are drawn inward reducing the effective area so as to control the amount of air entering and filling the canopy. Moreover as the canopy expands the flaps offer resistance to outward movement of the skirt, softening the expanding and opening action of the canopy and thereby reduce its shock loading. It is obvious that in large chutes a greater number of guide surface portions or panels 9 may be employed. It is also obvious that the length, shape and number of the flaps may be changed to suit the desired predetermined opening characteristics and number of the gores required, for instance a faster or slower opening characteristic can be obtained by varying the area of the flaps as using a relatively shorter or longer dimension for the flaps.

The spacing of the spoiler flaps 13 may be modified if desired. Where a very large number of gores or panels 9 are employed, as in a large chute, the flaps may be made wider so as to straddle one or more of the shroud lines with its opposite side edges connected to the shroud lines which extend at the sides of the group of radial panels and connected guide surface element which are subtended by the flaps. In this instance the intermedaite shroud lines would preferably be connected to the lower edges of these flaps. The spacing of the flaps around the lower edge of the guide vane surface portion 2 is not necessarily required to be uniform. If a forward descending movement is desired a greater number of the flaps 13 at one side of the canopy will permit greater spill out at the opposite side and consequently movement of the canopy during descent in a direction away from the descent axis toward the side having the greater number of flaps is obtained.

The upper edges of the flaps 13 are preferably secured throughout their full length across the corresponding lengths of the lower edge of the guide surface portion 2, however, in some instances it may be desirable to leave these edges unconnected, securing the flaps only at their side edges to the corresponding shroud lines. The vents 11 also provide a controlled spill out, retarding the rate of filling of the chute, also a small center or apex vent may be provided for ease of fabrication and it may even be eliminated altogether for further increasing the rate of filling of the canopy if desired.

In order to increase the effectiveness of the combination it is generally preferably to form the gores 6 and the guide vane panels 9 closing the ends of the gores 6 so as to present a relatively sharp or abrupt boundary at the edges of the guide vane panels. For this purpose the outer ends of the fabric panels used in forming the roof gores should be curved outwardly between the radial edges of the gores substantially as shown in Fig. 5. Further the end panels 9 should be formed of elements which are curved outwardly at the sides as shown in Fig. 5 so as to be of greater width intermediate the upper and lower edges thereof than adjacent said edges. Thus, as shown in Fig. 5, the outer end 6 of the gore is curved outward at the center while the end panel 9 is of greatest width near the mid portion thereof. The lower edge of the panel 9 presents a concave form as shown at 12. When elements of this character are stitched together adjacent their edges the boundary of the guide vane panel will present an abrupt edge with respect to the top of the canopy when the canopy is inflated. The turbulence of the air passing this boundary is thereby increased and the effective drag is greater than that of a canopy in which such curvature of the canopy forming panels is omitted. The outward inclination of the guide vane surface 9 with respect to the spoiler flaps 13 insures effective stabilizing action of the guide vanes since they project beyond the zone of turbulence produced by the spoiler flaps 13 located in advance thereof. The relatively strong outward curvature of the guide vanes in horizontal direction provides a favorably low tensile stress in the guide vane cloth for any given differential pressure.

In order to produce this described shape when inflated, the gores of the canopy have to be cut, when laid out flat, in a manner that they produce those cooperating surfaces with their particular intersections. Fig. 5 illustrates the pattern of the roof panels and guide vanes and the spoiler flaps. The numerals 6, 9 and 13 illustrate the shapes to be used in a 24 gore parachute while 6a, 9a and 13a indicate the pattern for the 12 gore parachute.

The outer ends of the roof gores are curved outward between the side edges thereof so as when extended as shown to constitute a double parabola which is developed by the intersection of the roof with the guide vane. Furthermore the opposite edges of the guide vanes are produced by the same intersection. The lower edge 12 of the panel 9 when laid out flat for cutting and finishing is concave as developed by the intersection of the inclined outwardly bowed guide vanes with horizontal plane.

The spoiler flaps 13 represent somewhat trapezoidal figures related to the roof gores and guide vanes and decrease in width as the number of gores required are increased. The length of the spoiler flaps 13 to a material extent control the opening characteristic of the guide surface parachute, this length being between 5 per cent and 50 per cent of the diameter of the canopy.

While one particular embodiment of the invention has been described, it is understood that the invention is not restricted thereto and all modifications are intended to be covered which would be apparent to one skilled in the art and which come within the scope of the appended claims.

I claim:

1. In a stabilized slow opening parachute, a canopy having a vertical descent axis, a plurality of adjoining radially disposed panels having a relatively high transverse camber at its outer edge, decreasing in camber toward its inner end with its outer end at opposite sides of the crown of the camber inclining downwardly and inwardly toward the descent axis of the canopy, air deflector closure panels secured across the outer ends of the radially disposed panels forming a plurality of lateral air deflecting guide surfaces spaced around the canopy periphery for lateral deflection of the air passing the base of the canopy during descent, shroud lines connected to the canopy at the junctures of the adjacent radially disposed panels and extending straight downwardly and inwardly from the outer side edges of the panels to the load suspension point and the descent axis of the canopy, and supplemental air deflector panel members having upper and lower edges disposed between the shroud lines with their upper edges secured to the lower edges of the air deflector panels, and side edges converging downwardly toward each other at equal angles parallel to the adjacent shroud lines and between the ends of the upper and lower edges of the supplemental air deflector panels, with said side edges each secured along its length to the shroud lines converging downwardly from the opposite sides of the radial panels to which the last mentioned air deflector closure panels are connected, forming means located immediately below the lower edges of the air deflector closure panels to retard the entrance of air into the canopy during initial opening of the parachute at high speeds to cause slower air filling of the parachute at higher initial velocities and provide supplemental upwardly and outwardly inclined air deflecting surfaces below the air deflector closure panels after the parachute has opened for increasing the stabilization and damping of the parachute during descent.

2. In a stabilized slow opening parachute for high speed release, a canopy having a vertical descent axis and a top composed of a plurality of radially disposed panels joined together along their radial edges, an air deflector closure panel secured across the outer ends of the first mentioned panels and inclining downwardly and inwardly toward the vertical descent axis of the canopy, shroud lines connected to the canopy at the junctures of the radially disposed panels, extending downwardly and inwardly from the outer side edges of the latter panels at said junctures toward the load suspension point and descent axis of the canopy, and substantially trapezoidal flexible air deflector panel members having substantially parallel wider upper and narrower lower edges and side edges converging downwardly at equal angles from said upper edges to said lower edges, connected at said upper edges at their opposite ends to the opposite sides of the lower edges of the air deflector closure panels, and secured along their converging side edges substantially their entire lengths, to the shroud lines at the opposite sides of the outer ends of said radial panels to which the last mentioned air deflector panels are connected, forming substantially trapezoidal air deflecting panels between the shroud lines immediately below the connected air deflector closure panels and radial panels.

3. In a slow opening stabilized parachute, a canopy having a vertical descent axis and a top comprising a plurality of radially disposed panels joined together along their side edges, shroud lines disposed in the valleys between the panels and secured to the outer ends of said panels and extending straight downwardly and inwardly from said outer ends toward a substantially common point in the said descent axis for connection and suspension of a load to be lowered by the canopy, the outer ends of said radially disposed panels inclining downwardly and inwardly toward the descent axis of the canopy at an angle greater than the straight downwardly and inwardly inclined directions of the shroud lines, an outwardly bowed flexible guide surface air deflector panel secured across the outer end of each of the radial panels and inclining downwardly and inwardly, relative to said descent axis, to the lower interconnected edges of said radial panels, a trapezoidal shaped air deflecting panel disposed with its widest edge secured to the lower edge of at least one of said outwardly bowed guide surface air deflector panels and connected along its opposite downwardly converging side edges to the straight downwardly and inwardly converging shroud lines adjacent the opposite sides of that guide surface air deflector panel to which the supplemental trapezoidal shaped air deflector panel is connected to form a supplemental air deflector immediately below that outwardly bowed guide surface air deflector panel for retarding the entrance of air into the canopy immediately below that connected guide surface air deflector panel during the release and the opening of the canopy at high speed and for retarding the lateral exit of air from the interior of the canopy immediately below that guide surface air deflector panel during the descent of the parachute to retard the lateral air spill-out from the canopy immediately below the said outwardly bowed guide surface air deflector panel to which it is connected.

4. A stabilized slow opening high speed parachute, a canopy having a vertical descent axis and a top comprising a plurality of radially disposed outwardly diverging crowned panels, each panel having its outer end at opposite sides of the crown of the panel inclining downwardly and inwardly toward a point in said descent axis at approximately 45°, guide surface air deflector panels secured across the outer ends of the radially disposed crowned panels, inclining downwardly and inwardly toward said point in the descent axis, shroud lines secured in the valleys formed by the adjoining crowned radial panels and extending straight downwardly and inwardly from the outer ends of the valleys toward a point in the descent axis of the canopy located materially below the first mentioned point in the descent axis and adapted to be secured to a load on the descent axis to be suspended and lowered by said canopy, spoiler flaps located immediately below the outer ends of predetermined circumferentially spaced radial panels and adjoining the lower edges of the guide surface air deflector panels for those radial panels, and between the straight downwardly and inwardly extending shroud lines at the opposite sides of said predetermined panels, said spoiler flaps being substantially trapezoidal with the opposite side edges of said flaps being secured throughout their lengths to those shroud lines, said flaps terminating in lower edges disposed substantially parallel to the lower edges of the guide surface panels immediately thereabove, the lower edges of the flaps being materially spaced below the upper edges to provide a plurality of downwardly and inwardly inclined velocity control flaps disposed in spaced relation around the said descent axis below the guide surface panels, for retarding the entrance of air into the canopy during initial opening at high speed and permitting air spill out between said spaced flaps during descent of the canopy.

5. Apparatus as claimed in claim 4 including flexible elongated connected means extending between the lower ends of the circumferentially spaced velocity control flaps and connected thereto for preventing outward radial displacement of said lower ends by air pressure entering within the canopy below the said flaps following release and expansion of the canopy at high velocity and retaining the lower ends of the flaps in a predetermined relation to each other during initial release at high speed.

6. Apparatus as claimed in claim 4 in which the canopy is composed of an even number of adjoining radial panels and said spoiler flaps are disposed immediately below the guide surface panels at the ends of alternate radial panels with their upper ends secured to the lower edges of those guide surface panels and their side edges secured throughout their lengths to the shroud lines at the opposite sides of the said alternate radial panels.

7. Apparatus as claimed in claim 6 including flexible tie in tape members extending across the space between each of the said flaps at the lower edges thereof and connected at its opposite ends to said lower edges of the spaced spoiler flaps to retain the lower edges of said spaced flaps in predetermined spaced relation to each other during release and opening of the parachute at high velocities.

8. In a low opening shock parachute having a canopy with a vertical descent axis and an upper load supporting portion, shroud lines connected to the canopy adjacent the outer periphery of said load supporting canopy portion, and guide surface means symmetrically disposed around the canopy immediately below said outer periphery, presenting inwardly and downwardly inclined air deflecting surfaces with their lower edges located inwardly and below said outer periphery, and a plurality of spoiler flaps disposed in predetermined spaced relation to each other around said descent axis, said spoiler flaps having upper edges secured to the lower edges of said guide surface means and opposite side edges inclining inwardly and downwardly toward said descent axis between spaced shroud lines with said side edges secured to said spaced shroud lines throughout the lengths of said side edges, said flaps having lower edges extending between said spaced shroud lines in a plane below the lower edges of the said inclined air deflecting surfaces, parallel thereto.

9. Apparatus as claimed in claim 8 in which means are provided for connecting the lower edges of the spoiler flaps together, comprising flexible tape members extending between the relatively spaced adjacent lower edges of the flaps, and secured to said edges to retain the lower edges of the spoiler flaps in predetermined relation to each other during opening, filling, and descent of the canopy.

10. A guide surface parachute for high speed release having low opening shock substantially not exceeding the steady drag, comprising a canopy having a top, a guide surface portion extending around the canopy, inclining downwardly and inwardly from the outer periphery of the top toward the vertical descent axis of the canopy at substantially 45°, shroud lines connected at spaced points around the lower edge of the guide surface portion and inclining straight downwardly and inwardly toward said vertical descent axis at substantially less than 45°, and a plurality of spoiler flaps spaced around the said descent axis, connected at their upper edges to the lower edge of the guide surface portion between said spaced shroud lines with their side edges inclining downwardly and inwardly toward each other and toward said descent axis in the direction of shroud lines at the opposite side edges of the said flaps and connected along said opposite side edges to said last mentioned shroud lines, said flaps having a substantially trapezoidal outline with their lower edges extending between the connected shroud lines parallel to the lower edge of the guide surface portion, the distance between the upper and lower edges of the said flaps being between 10% and 30% of the diameter of the canopy.

11. A parachute canopy comprising a plurality of radially extending gores secured together along their adjacent edges, shroud lines extending straight downwardly and inwardly from the canopy to a load support, guide surface panels closing the ends of said gores and inclined upwardly and outwardly with respect to said shroud lines, and circumferentially spaced supplemental air deflecting flaps extending between said shroud lines with their opposite side edges generally parallel to said shroud lines below the lower edges of said guide surface panels.

12. In a parachute of the class described, a canopy having a vertical descent axis and a top composed of a plurality of radially disposed preshaped panels, each panel having a relatively high transverse camber extending longitudinally of the panel, and air deflector closure panels secured across the outer ends of the first mentioned panels and inclining downwardly and inwardly therefrom toward the vertical descent axis of the canopy to form air spoiler edges around the periphery of the canopy, and forming lateral air deflectors around the canopy periphery for laterally deflecting the air passing the base of the canopy during its descent, and circumferentially spaced supplemental air deflecting flaps extending between the shroud lines with their opposite side edges generally parallel to said shroud lines below the lower edges of said guide surface panels and connected along their side edges to the adjacent shroud lines.

13. In a parachute of the class described, a canopy having a relatively flat camber, composed of a plurality of radially disposed panels connected together along their opposite edges, said panels each being longitudinally crowned between their connected edges, an end closure panel secured across the outer end of each of the longitudinally crowned portions of the panels, and inclining straight inwardly and downwardly to form a tapered air deflecting surface at the outer end of the panel and an air spoiler edge at the juncture between the radial and inclined panels, and circumferentially spaced supplemental air deflecting flaps extending between the shroud lines with their side edges generally parallel to the adjacent shroud lines at opposite side of the flaps below the lower edges of said guide surface panels.

14. A parachute canopy comprising a plurality of radially extending gores secured together along their adjacent edges, each gore having the outer end thereof formed with an outwardly curving extension between said edge, the end of each gore being secured to the edge of an air vane guide surface end closure panel which is greater in width midway of the height of the panel than at the lower edge thereof whereby said panel will present an abrupt air spoiler edge with respect to the top of the canopy when the canopy is fully inflated.

15. A preshaped parachute canopy comprising a plurality of radial gores secured together along their adjacent edges, each gore being crowned transversely intermediate its side edges and curved longitudinally between its inner and outer ends, formed of a flat segmental fabric sheet having its outer end portion curved outwardly between the outer ends of its side edges merging into reversely curved edges adjacent each end intermediate the outer ends of the side edges and the outwardly curved portion, said side edges being sharply curved at their outer ends toward each other away from said outwardly curved outer edge, decreasing in curvature toward the inner ends of the gores, a slanted air vane guide surface panel secured across the outer end of each of the gores formed from a flat fabric sheet having a substantially semi-elliptical shape having a height and width intermediate its upper and lower edges in excess of the height and width of the outer end of the radial gore end when the parachute is inflated, shroud lines extending downwardly and inwardly from the outer ends of the adjacent secured edges of the radial gores toward the descent axis of the canopy for connection to a load to be suspended and lowered by the parachute, whereby the air vane guide surface end closure panels are inclined and free to bag outwardly from the outer ends of the radial roof gores to a predemined degree, said guide vane closure panels each having a lower edge curving inwardly between the opposite ends of the substantially semi-elliptical edge and secured throughout a major portion of the length of said semi-elliptical edge, intermediate the outer ends of the sides of the radial gore, to the outer end of the radial gore.

16. Apparatus as claimed in claim 15, including a plurality of air-deflector flaps inclining downwardly and inwardly from the lower edges of predetermined spaced air-vane guide surface end closure panels between predetermined pairs of said shroud lines to a predetermined distance below the lower edge of said panels, said air deflector flaps having their lower ends parallel to said upper ends and spaced opposite side edges tapering downwardly and inwardly toward each other in juxtaposed parallel relation throughout their lengths to the shroud lines and secured thereto.

17. Apparatus as claimed in claim 14, including a plurality of air-deflector flaps inclining downwardly and inwardly from the lower edges of predetermined spaced air-vane guide surface end closure panels between predetermined pairs of said shroud lines to a predetermined distance below the lower edge of said panels, said air-deflector flaps having their lower ends parallel to said upper ends and spaced opposite side edges tapering downwardly and inwardly toward each other in juxtaposed parallel relation throughout their lengths to the shroud lines and secured thereto.

References Cited in the file of this patent

UNITED STATES PATENTS

| | | |
|---|---|---|
| 2,462,864 | Heinrich | Mar. 1, 1949 |
| 2,562,799 | Kowalski | July 31, 1951 |

FOREIGN PATENTS

| | | |
|---|---|---|
| 553,653 | France | Feb. 14, 1923 |